METHOD AND APPARATUS FOR INJECTING A LIQUID PROPELLANT IN HYBRID ROCKET MOTORS

Filed June 25, 1964

FIG. A.
(PRIOR ART)

FIG. B.
(PRIOR ART)

LEROY J. KRZYCKI
HUGH P. JENKINS, JR
INVENTORS.

BY V. C. MULLER
ATTORNEY.

United States Patent Office 3,302,403
Patented Feb. 7, 1967

3,302,403

METHOD AND APPARATUS FOR INJECTING A LIQUID PROPELLANT IN HYBRID ROCKET MOTORS

Leroy J. Krzycki and Hugh P. Jenkins, Jr., China Lake, Calif., assignors to the United States of America as represented by the Secretary of the Navy Filed June 25, 1964, Ser. No. 379,069
1 Claim. (Cl. 60—220)

The invention described herein may be manufactured and used by or for the Government of the United States of America for governmental purposes without the payment of any royalties thereon or therefor.

This invention relates to rocket motors and more particularly to improvements in method and apparatus for injecting a liquid propellant into the combustion chamber of a hybrid type of rocket motor.

A hybrid rocket motor may be defined as one in which the entire supply of fuel or oxidant, usually in solid form, is located within the combustion chamber and the deficient propellant is added to the chamber in a controlled manner to effect stable and complete combustion. FIG. A illustrates one form of such motor in which a solid propellant grain is disposed within a motor casing and the deficient liquid propellant is injected through the forward closure of the motor at a controlled rate through a multi-orifice spray injector. The disadvantages of this type of injection reside in the poor mixing of the injected liquid with the particles burning in the chamber, the complexity and attendant high cost and the difficulty or uniformly consuming the solid propellant. FIG. B illustrates another form of such motor in which the liquid is injected through a pintle or piccolo tube provided with apertures along its length. While this provides a more uniform distribution of the liquid to the chamber and hence more uniform consumption of the solid propellant it suffers the disadvantages of complexity and difficulty of maintaining its structural integrity in the hot gas environment.

One of the objects of this invention is to provide novel method and apparatus for injecting a liquid propellant into a hybrid rocket motor which obviates the disadvantages of the prior art devices referred to.

Another object is to effect injection of the liquid propellant with simplified apparatus.

A further object is to consume a solid propellant at uniform rate along its length.

Figure 1:
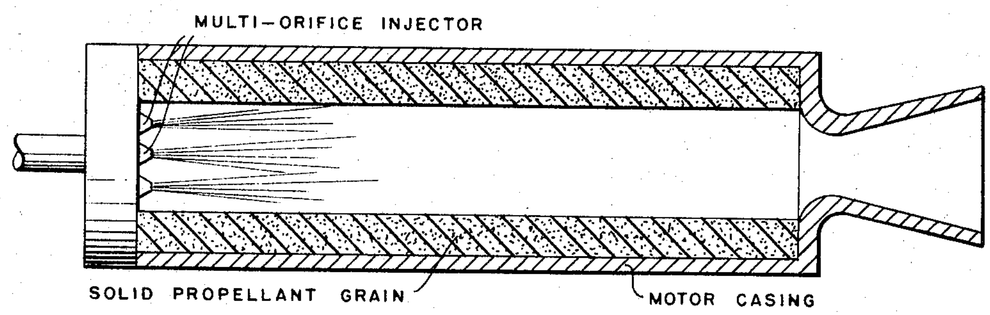
Figure 1:
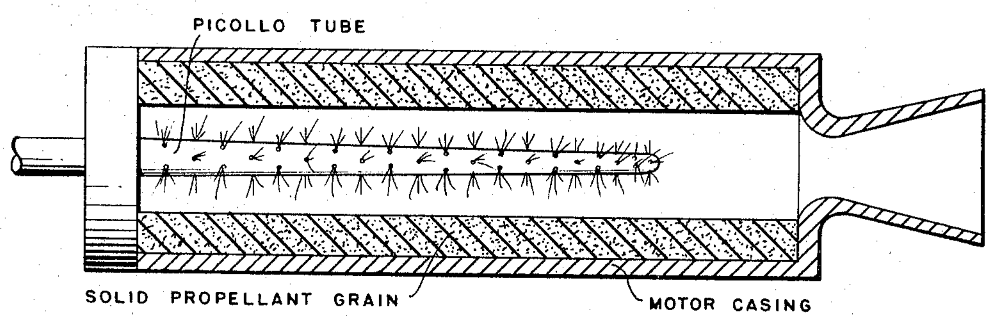
Figure 1:
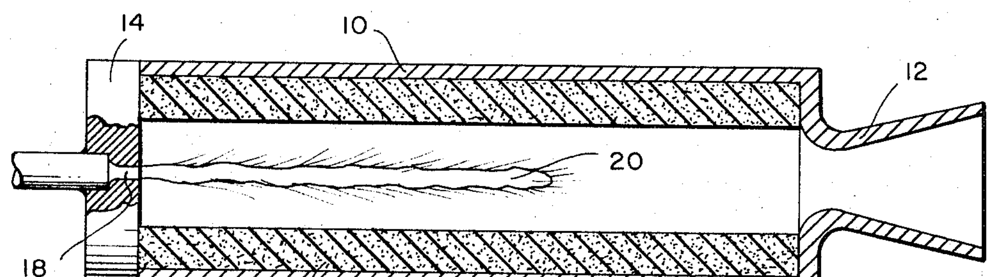

Still further objects, advantages and salient features will become more apparent from a consideration of the description to follow, the appended claims, and the accompanying drawing, in which:

FIGS. A and B are longitudinal central sections through rocket motors of the prior art, and FIG. 1 is a like section through the subject of this invention.

The application of Leroy J. Krzycki for Method and Apparatus for Injecting a Secondary Propellant in Multi-Heat Release Combustors Serial No. 379,068, filed June 25, 1964 discloses a rocket motor in which a secondary liquid propellant is injected into a combustion chamber in a coherent stream, the other propellant being supplied in any conventional manner. The principal difference between such device and the present invention resides in employing a solid propellant within the combustion chamber, which constitutes the entire supply of one of the propellants, and which is uniformly consumed, rather than delivered to the chamber at a controlled rate.

Referring now to the drawing, the invention comprises a rocket motor tube 10 having an exhaust nozzle 12 at one end and a closure 14 at the other end, the tube containing a solid grain of propellant 16, all of which is conventional as illustrated in FIGS. A and B. Unlike the prior art referred to, closure 14 is provided with a single orifice 18 which delivers an axial coherent stream of liquid 20, which is the deficient propellant required to combust the solid propellant. If the liquid is the fuel, the solid propellant is an odizixer, and if the liquid is the oxidizer then the solid propellant is the fuel.

As more fully set forth in the application referred to, it has been discovered that if a liquid propellant is injected axially rearwardly in a combustion chamber as a coherent stream, rather than as a spray or as atomized particles, part of the liquid can be sheared from the stream at a selected combustion zone and the remainder delivered through this zone for delivery at another spaced combustion zone. Based upon this discovery it has been found that by suitable control of the diameter of the stream and its velocity, it can be delivered substantially uniformly to the entire length of a solid grain propellant so that the latter is consumed substantially uniformly along its length.

The foregoing phenomena may be explained as follows: First, the coherent stream is injected parallel and in the same direction of flow of the combustion products and its main mass will not react until it has been vaporized. As the coherent stream progresses down the combustion chamber droplets are sheared off from the main stream by the effects of the relative velocity between the stream and the surrounding gas and by the turbulence of the surrounding gas. The coherent stream also tends to disintegrate because of its own internal stresses. The stream of injectant will be surrounded by a mist of small droplets. These droplets will vaporize and react with the particles burning on the surface of the solid propellant and in the flow of the combustion chamber. Diffusion of the vapor takes place because of the convective currents in the chamber. Since all chemical reaction should occur within the combustion chamber the diameter and velocity of the coherent stream of propellant should be carefully matched to the length of the rocket engine and the expected combustion chamber pressure (which affects the density of the combustion products and, hence, the shearing rate between the injected propellant stream and the surrounding gas) to ensure that all injected propellant will be sheared from the coherent stream prior to the sonic throat.

The approximate rate of flow (which may vary, if desired, due to change of combustion chamber volume) of the liquid propellant may be determined in the same manner as in the prior art head-end or piccolo injection motors previously referred to. There will thus be infinite combinations of stream diameter and stream velocity which will provide the calculated flow. Which combination to employ can be determined experimentally by observing the conditions of the propellant grain or motor tube at the conclusion of a firing and suitable instrumentation during burning. Thus, if a predetermined quantity of liquid is injected which is calculated to stoichiometrically react with the rocket grain, and within a predetermined time, the grain should be consumed at the same time that the injection ceases. If injection continues after consumption of the grain it will be apparent that the average reaction was not stoichiometric. Similarly, if injection terminates prior to consumption of the grain the average reaction was not stoichiometric. Also, if the grain is not consumed in the portions remote from the injection orifice this will indicate that the length of the coherent stream should be adjusted to reach such remote portions. Also, an unconsumed portion may result in a burned motor tube in an area where the propellant has been completely consumed. It has been observed that for constant injection pressure an increase in orifice size will give an increase in penetration which is explained by the fact that the momentum of the injected liquid increases approximately with the square of the injection orifice diameter while the area of the coherent stream or jet exposed to resistance by the combustion products increases in direct proportion to the orifice diameter. Thus, for larger orifices the gas resistance will be relatively smaller and the stream will penetrate further.

Obviously many modifications and variations of the present invention are possible in the light of the above teachings. It is therefore to be understood that within the scope of the appended claim the invention may be practiced otherwise than as specifically described.

The explanation of the control of disintegration of the coherent jet, to render it available at desired spaced heat release zones, is not without its difficulties; however, considerable investigations have been made of the phenomena. It is known, first, that the potential energy of the injected liquid is converted into kinetic energy in the discharge orifice. When the liquid leaves the orifice each particle may have both axial and radial velocities. If the flow in the orifice is laminar and has a uniform velocity profile, there will be only an axial velocity. If the flow is turbulent, however, or if there is non-uniform velocity profile, a radial velocity component will exist. During the flow through the orifice the liquid is restrained in the form of a continuous jet by the orifice wall which can introduce turbulence in the stream. As the jet leaves the orifice it begins to widen and disintegrate as the radial velocity and surrounding gas becomes effective. The length of the jet and its disintegration characteristics are thus dependent upon the design of the orifice. One of the major criteria or simple orifice injectors is the ratio of orifice length to orifice diameter, the $L/D$ ratio. At low values of $L/D$ the effective jet, contracted at the entry to the orifice, has no time to re-expand and fill the passage. The velocity coefficient is comparatively low. With increasing $L/D$ the jet re-expands in the passage and the coefficient increases, reaching a maximum for the simple orifice injector at a value of $L/D$ between 4 and 6. Injection pressure has little effect on the value of the coefficient especially for low values of $L/D$ (less than 3). For higher values of $L/D$, the coefficient decreases with an increase in injection pressure because of increased jet contraction and increased velocity losses. Large $L/D$, however, allows sufficient passage length for the development of turbulent flow.

What is claimed is:

A method of stoichiometrically combusting bi-propellants in a hybrid rocket motor, one of said propellants being an elongated centrally perforate solid propellant grain adapted to be consumed radially outwardly from its internal surface, and the other being a liquid adapted to be delivered to the space within the solid propellant, comprising, (a) injecting said liquid from the forward end of said motor in a direction axially within the grain and parallel to the direction of flow of combustion gases, in a single coherent stream and at a velocity such that portions of the stream are progressively removed therefrom for substantially uniform reaction with the rocket grain along the length of its inside surface.

References Cited by the Examiner

UNITED STATES PATENTS

| | | | |
|---|---|---|---|
| 2,996,880 | 8/1961 | Greiner | 60—35.6 |
| 3,093,960 | 6/1963 | Tyson | 60—35.6 |
| 3,144,751 | 8/1964 | Blackman et al. | 60—35.6 |
| 3,173,251 | 3/1965 | Allen et al. | 60—35.6 |

FOREIGN PATENTS

| | | |
|---|---|---|
| 646,363 | 8/1962 | Canada. |

References Cited by the Applicant

| | | |
|---|---|---|
| 2,998,703 | 9/1961 | Badders. |
| 3,068,641 | 12/1962 | Fox. |

CARLTON R. CROYLE, *Primary Examiner.*

MARK NEWMAN, *Examiner.*